March 3, 1964 W. L. GASKELL ETAL 3,123,108
RADIAL ARM SAW
Filed Feb. 1, 1961 7 Sheets-Sheet 6

INVENTORS
Walter L. Gaskell
Charles L. Seitz
BY
Harness, Dickey & Pierce
ATTORNEYS

United States Patent Office 3,123,108
Patented Mar. 3, 1964

3,123,108
RADIAL ARM SAW
Walter L. Gaskell, Ypsilanti, and Charles L. Seltz, Ann Arbor, Mich., assignors to King-Seeley Thermos Co., a corporation of Michigan
Filed Feb. 1, 1961, Ser. No. 86,454
2 Claims. (Cl. 143—6)

This invention relates generally to woodworking tools, and more particularly to an improved radial arm saw.

A radial arm saw, in accordance with the present invention, is relatively accurate, flexible and is relatively economical to manufacture. Accuracy, flexibility and manufacturing economy are achieved through a novel orientation of the relatively moving components of the saw coupled with the provision for adjustment of the relatively moving components, both to compensate for the dimensional errors inherent in any manufacturing process, and, in order to make the radial arm saw more practicable in field use, to compensate for wear of the relatively moving components.

The radial arm saw comprises a base surmounted by a work supporting table. A vertically oriented column is supported by the base and supports a radial arm at its upper end. A carriage is supported by and movable longitudinally of the radial arm for the support of a power unit comprising an electric motor and a tool holding arbor. The power unit is movable in translation longitudinally of the radial arm to effect, for example, a cut in the workpiece.

Flexibility of the radial arm saw is maximized by a construction that provides for rotation of the vertical column with respect to the work supporting table thereby to provide for orientation of the arm and cutting blade to any angle drawn in the plane of the work table. The arm is elevatable with respect to the column and table to vary the depth of cut effected by the blade and to accommodate workpieces of varying thickness. The depth of cut is related to the vertical position of the arm with respect to the column and table, to the thickness of the workpiece, and to the angle of the cutting blade with respect to the plane of the table. The power unit is rotatable with respect to its carriage about both a horizontal axis and a vertical axis thereby to maximize the flexibility thereof. The table is slidable in its own plane with respect to the vertical column to maximize the length of a transverse cut possible on the workpiece.

Accordingly, one object of the present invention is an improved radial arm saw of the type particularly adapted for the mass market in home woodworking tools.

Another object is a radial arm saw wherein the vertical support column is rotatable with respect to a saw table.

Another object is a radial arm saw wherein the radial arm is elevatable with respect to the vertical support column.

Another object is a radial arm saw having a plurality of mutually complementary adjustments to minimize production tolerance limitations.

Another object is a radial arm saw having improved means for locking the relatively movable components in a desired position.

Other objects and advantages of the present invention will become apparent from the study of the following specification and claims wherein reference is made to the drawings in which:

Figure 1:
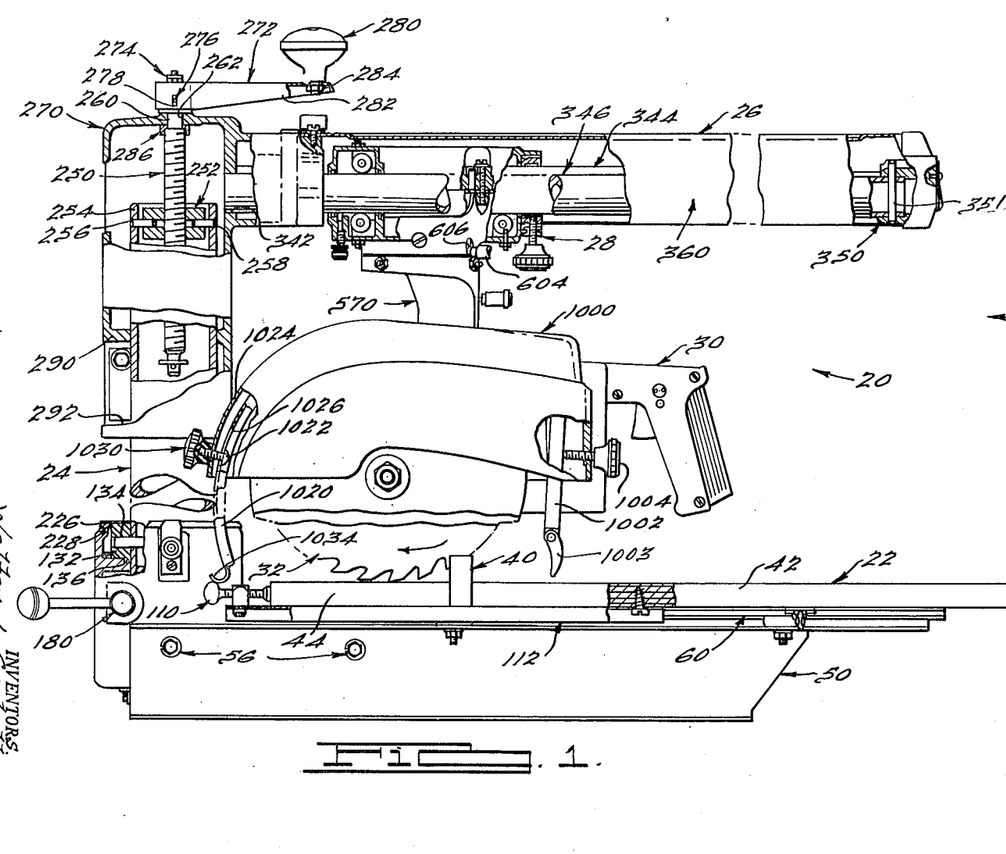
FIGURE 1 is a side elevational view of the radial arm saw partially broken away for clarity.

Referring to FIG. 1, a radial arm saw 20 in accordance with the present invention comprises a work supporting table 22, a vertically oriented column 24, a radial arm 26, and a carriage 28 movable longitudinally of the radial arm 26 for the support of a power unit 30 having a tool 32, for example, a disc saw, mounted thereon. The column 24 is supported for rotation with respect to the table 22 to provide for movement of the arm 26 to any desired angle with respect to the table 22. The arm 26 is elevatable with respect to the table 22 and column 24 to vary the depth of cut of the blade 32 and to accommodate workpieces of varying thickness. The carriage 28 is movable longitudinally of the arm 26 to effect a cut in the workpiece at an angle dictated by the rotational position of the arm 26. The depth of cut is dictated by the vertical position of the arm 26 with respect to the column 24 and table 22 as well as to the thickness of the workpiece and to the angle of the blade 32 with respect to the plane of the table 22.

More specifically, the radial arm saw 20 comprises the table 22 preferably made of laminated wood construction, for example plywood, for the support of a workpiece (not shown). The table has an upstanding guide 40 that extends laterally across the table near the rearward edge thereof to define an index position for the workpiece with respect to the angular position of the radial arm 26. It is to be noted that the table 22 comprises a front portion 42 and a rear portion 44, the guide 40 being interposed therebetween. The guide 40 is removable from this intermediate position and insertable behind the rear portion 44 to facilitate ripping of relatively wide workpieces, as will be discussed.

Figure 2:
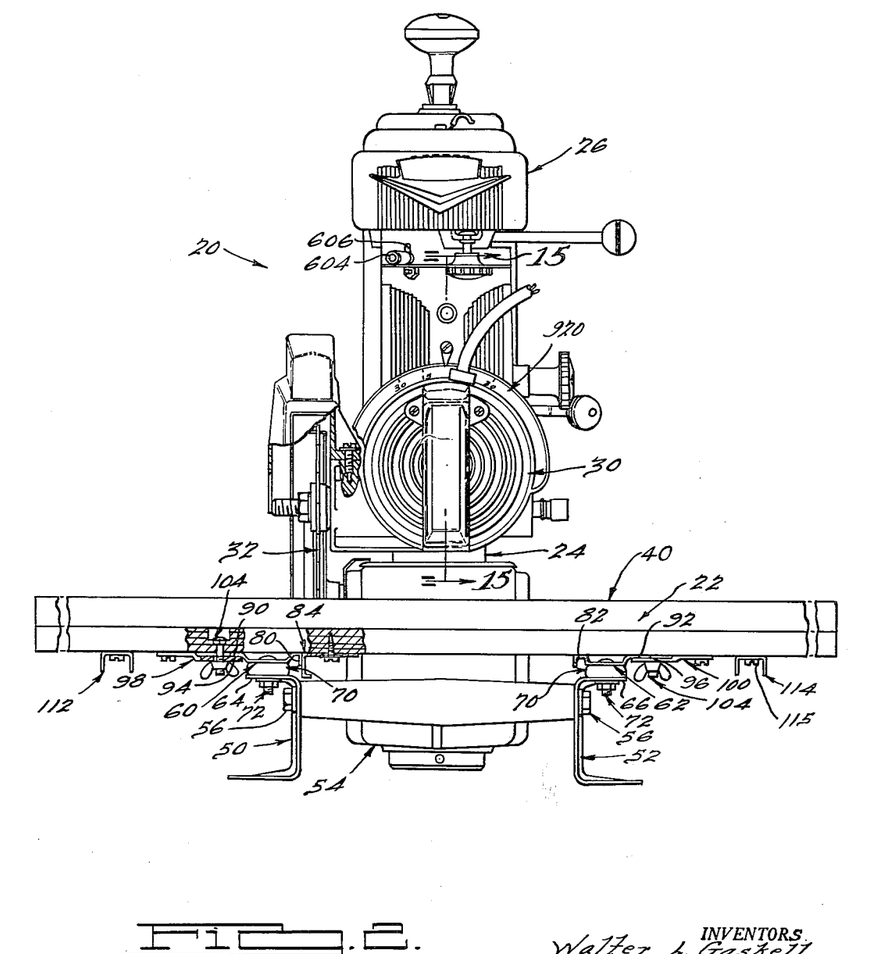
FIG. 2 is a front elevational view of the radial arm saw taken in the direction of the arrow 2 of FIGURE 1.

As best seen in FIGURE 2, a pair of generally parallel forwardly extending table support channels 50 and 52 are secured to a base casting 54 by a plurality of machine screws 56. A pair of forwardly extending rails 60 and 62 surmount the upper flange portions 64 and 66 of the channels 50 and 52, respectively, and are spaced therefrom by a plurality of resilient pads 70 that are interposed between the rails 60–62 and the flanges 64–66. Complementary bolts 72 extend centrally of each pad 70 to bias the rails 60 and 62 toward the channels 50 and 52 respectively thereby to compress the pads 70. In this manner the rails 60 and 62, and therefore the table 22 may be leveled or adjusted to a desired position with respect to the base 54 simply by tightening selected ones of the bolts 72, thereby to compress associated ones of the pads 70.

The rail 60 has a downwardly extending flange 80 on the inner edge thereof which is engageable with a forwardly extending guide rail 84 on the underside of the table 22.

In this manner, the table 22 is guided for movement parallel to and with respect to the channels 50 and 52. The rails 60–62 have outwardly extending terminal edges 90 and 92 that are engaged by a pair of underlying fingers 94 and 96 on a pair of table locking brackets 98 and 100, respectively. A plurality of screws 104 with wing nuts attached thereto extend downwardly through the front portion 42 of the table 22 and through suitable apertures in the fingers 94 and 96 of the brackets 98 and 100 so as to facilitate tightening of the fingers 94 and 96 against the outboard flanges 90 and 92 on the rails 60 and 62, thereby to lock the table 22 against movement with respect to the channels 50 and 52. Screws 105 (FIGURE 3) in the front table portion 42 hold the fingers 94, 96 in sliding engagement with the flanges 90, 92.

A pair of thumb screws 110 (one of which is shown in FIGURE 1) are secured to the rearward end of the rails 112 and 114, thereby to lock the guide rail 40 between the table sections 42, 44. If desired, the guide rail 40 can be removed from its position intermediate the front and rear sections 42 and 44 of the table 22 by simply loosening the thumb screws 110, removing the rail 40, sliding the rear section 44 forwardly, replacing the rail 40 at the rearward edge of the table, and tightening the thumb screws 110. The rails 112, 114 are fixed to the front table portion by screws 115.

As shown in FIGURE 1 of the drawings, when the carriage 28 is at the rearward limit of movement, the vertical center line of the disc saw 32 is spaced rearwardly of the guide 40 and forwardly of the rear edge of the table 22. The aforementioned slideable relationship between the table 22 and channels 50 and 52 permits workpieces wider than the full travel of the saw to be cut. Initially, the carriage 28 is positioned as far rearward as possible and the workpiece positioned forward of the saw, just clearing the teeth. A first cut is made to the limit of forward travel of the carriage 28. The saw then is stopped and the carriage 28 moved to the rear. The cut is completed by positioning the table 22 rearwardly as far as possible, with the guide 40 at the rear edge and the workpiece against the guide. The previously described guide 84 insures that the table will remain properly aligned with the saw to complete the cut.

Adjustability of the guide 40 of the table is also desirable to facilitate ripping of wide workpieces.

Figures 3, 4:
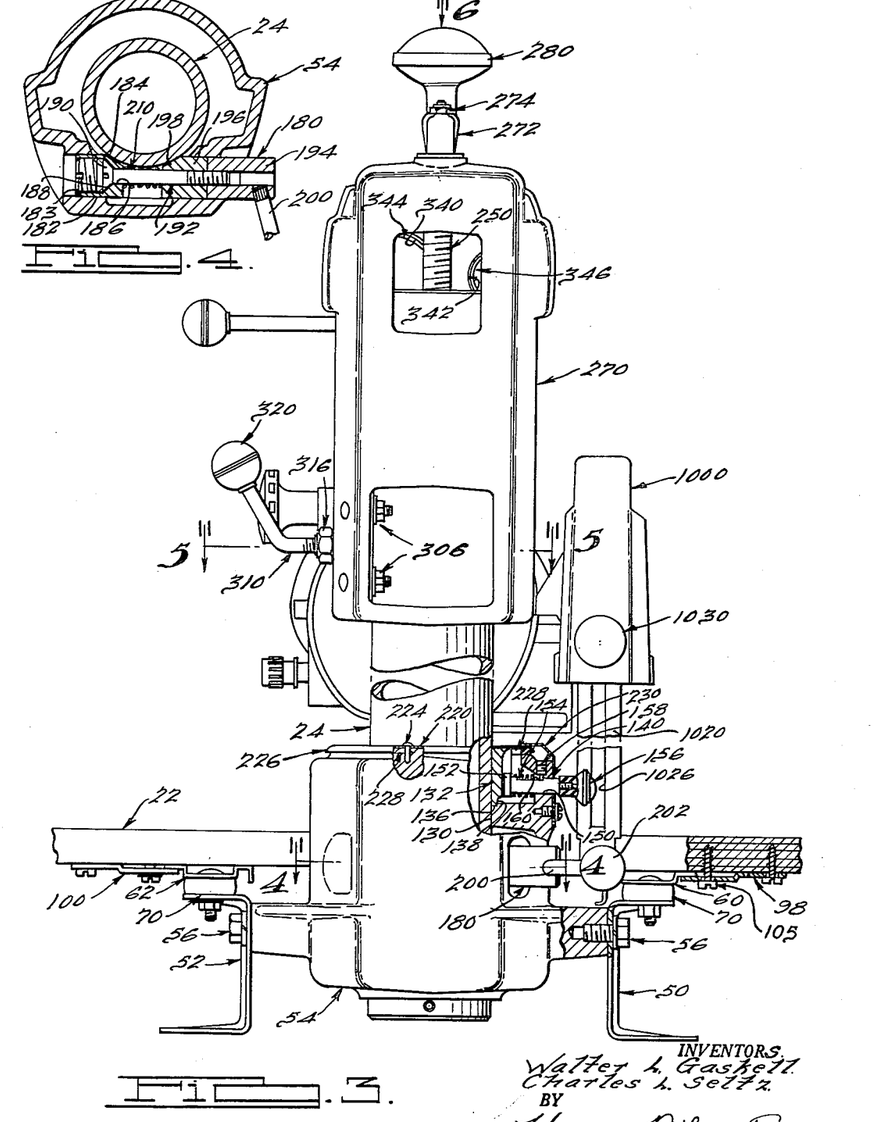
FIG. 3 is a rear elevational view of the radial arm saw taken in the direction of the arrow 3 of FIG. 1.
FIG. 4 is a cross sectional view taken substantially along the line 4—4 of FIG. 3.

As best seen in FIGURE 3, the column support casting 54 has a vertical bore 130 therein for the acceptance of the vertically extending column 24. The column 24 is supported for rotation with respect to the column support casting 54 by an annular ring 132 that is keyed to the column 24 as by a pin 134 (FIGURE 1). The ring has a lower end face 136 that is engageable with an annular seat 138 on the base support casting 54 to transfer the load of the column 24 to the base casting 54.

The arm 26 and vertical column 24 are radially indexed to major angles with respect to the base casting 54 by an index pin 140 (FIGURE 3) that drops into one of a plurality of rectangular index slots (FIGURE 13) 142, 144 and 146 in the annular ring 132. The index pin 140 is slideably supported in a transverse bore 150 in the base casting 54 and has a rectangular inner end portion 152 for engagement in one of the slots 142, 144 and 146 in the annular ring 132, a spring 154 normally biasing the index pin 140 radially inwardly toward the annular ring 132. A handle 156 facilitates pulling of the pin outwardly to index the column. A suitable set screw 158 engages a complementary flat 160 on the index pin 140 to preclude rotation of the pin in the bore 150 in the base casting 54.

Referring to FIG. 4, the column 24 is lockable against rotation with respect to the base casting 54 by a barrel lock 180. The barrel lock 180 comprises a head portion 182 that is supported within a bore 183 in the base casting 54 for movement axially thereof. The head portion 182 has a tapered cam face 184 engageable with the column 24 and a central bore 186 with a conical seat 188 therein for the acceptance of the head portion 190 of a locking screw 192.

The locking screw 192 extends generally tangentially to the vertical column 24 and is threadably engaged with a complementary nut 194 to effect tightening of the barrel lock 180. A cam member 196 is interposed between the head portion 182 and the nut 194 and has a cam face 198 engageable with the column 24. A suitable handle 200 having a knob 202 (FIGS. 1 and 3) at the outer end thereof is secured to the nut 194 to facilitate rotation thereof. A spring 210 is interposed between the head and cam members 182 and 196 of the barrel lock 180 to normally bias these components apart to facilitate rotation of the column 24 with respect to the base casting 54. It is to be noted that the tightening screw 192 is adjustable to an initial position as by rotating the screw 192 with respect to the nut 194 which is accomplished by inserting a screwdriver in the head portion 190 of the screw 192. A suitable plug is advanceable axially of a counterbore in the head 182 to lock the screw 192 in the initial position. After an initial bias of the head 182 and cam member 196 on the column 24 is obtained, tightening of the barrel lock 180 is effected by rotating the handle 200 through a relatively small arc thereby to restrict rotation of the column 24. In this manner, the barrel lock 180 is relatively easily adjustable to preclude the condition obtaining wherein a large increment of rotation is required of the handle 200 to effect locking of the barrel lock 180 against the column 24.

Figure 13:
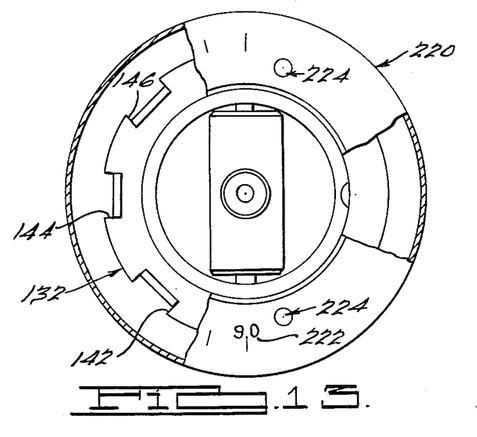
FIG. 13 is a top view, partially in section, of the vertical column with the radial arm removed therefrom.

As best seen in FIG. 13, an index plate 220 having appropriate indicia 222 on the upper surface thereof is secured to the upper face of the annular ring 132 as by a plurality of drive pins 224. The index plate 220 has a downwardly turned outer peripheral edge 226 (FIG. 1) for the retention of a seal 228 between the upper edge face of the base casting 54 and the index plate 220, thereby to preclude the infiltration of foreign material into the base assembly. A pointer 230 (FIG. 3) is secured to the base casting 54 to cooperate with the indicia 222, giving a visual indication of the rotative position of the column 24 and radial arm 26 with respect to the base casting 54.

As best seen in FIG. 1, a downwardly extending screw 250 is threadably engaged in a transversely extending nut 252 in an upper end portion 254 of the column 24. The nut 252 is secured to the upper end portion 254 of the column 24 as by a pair of pins 256 and 258 and is movably axially of the pins 256 and 258 to facilitate self-alignment with respect to the column 24.

An upper end portion 260 of the screw 250 is journaled in a complementary bore 262 in a head casting 270. A handle 272 is secured to the upper end portion 260 of the screw 250 as by a nut 274, relative rotation therebetween being restricted by a transverse pin 276. The pin extends radially outwardly through a vertically orientated slot 278 in the handle 272 to provide for tightening of the handle 272 downwardly against the head casting 270 to accommodate wear therebetween. A suitable hand knob 280 is secured to an outer end portion 282 of the handle 272 as by a screw and nut 284.

Elevation of the head casting 270 with respect to the column 24 is effected by rotation of the handle 272 with respect to the head casting 270, the screw 250 upon rotation moving axially of the nut 252 which movement is transmitted to the head casting 270 by a thrust bearing 286 at the upper end of the screw 250. The head casting 270 is provided with a pair of annular bearing flanges 290 and 292 that engage the vertical column 24 in slideable relation to guide the head casting 270 for vertical movement.

Figures 5, 6, 7:
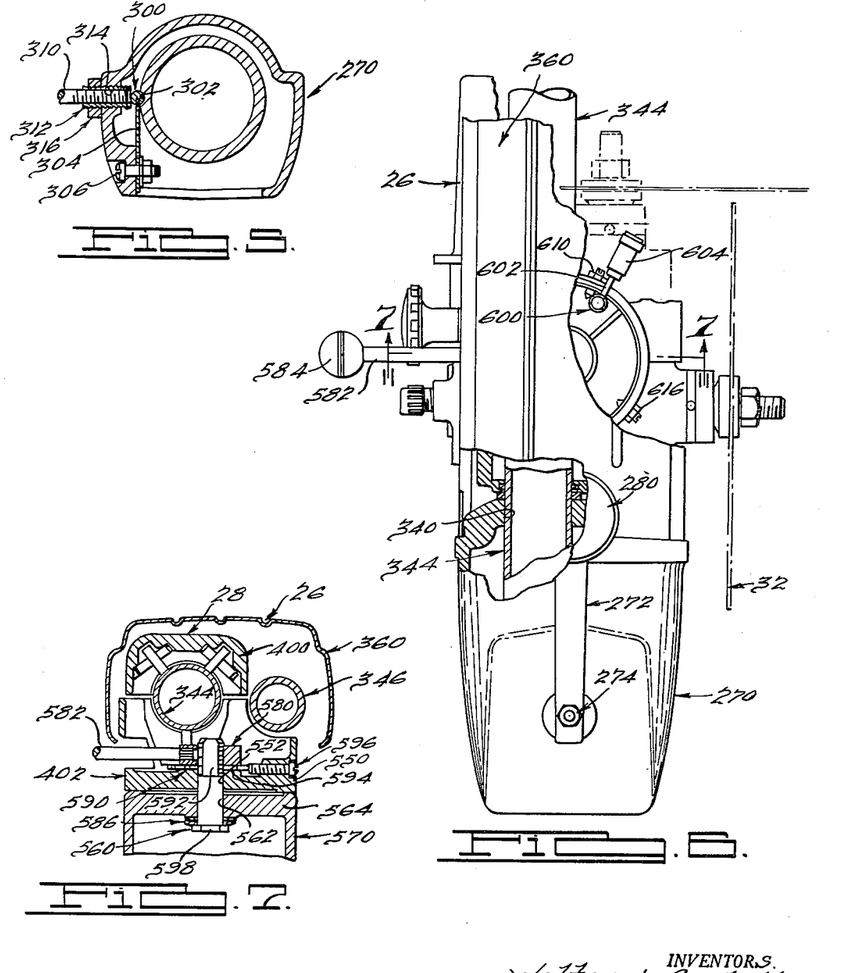
FIG. 5 is a cross sectional view taken substantially along the line 5—5 of FIG. 3.
FIG. 6 is a top view of the radial arm saw taken in the direction of the arrow 6 of FIG. 3.
FIG. 7 is a cross sectional view taken substantially along the line 7—7 of FIG. 6.

As best seen in FIGURE 5, relative rotation between the head casting 270 and the vertical column 24 is prevented and frictional locking is effected by a key 300 that is slideable longitudinally of the vertical column 24 in a complementary key-way 302. The key 300 is resiliently supported with respect to the vertical column 24 by a spring member 304 that is fixedly secured to the head casting by nuts and bolts 306. The key 300 is biased into the key-way 302 to lock the head 270 against movement vertically with respect to the column 24 by a locking screw 310. The locking screw 310 is threadably engaged in an internally and externally threaded bushing 312 that is accepted in a complementary threaded bore 314 in the head casting 270. The bushing 312 is locked against axial movement with respect to the head casting 270 by a lock nut 316. The bushing 312 is first advanced with respect to the head casting 270 to position the inner end portion of the bushing in loose engagement with the key 300. The lock nut 316 is then tightened, whereupon tightening or backing off of the locking screw 310, as by rotation of a handle 320 (FIGURE 3), effects relative axial movement of the locking screw 310 with respect to the bushing 312 and key 300. In this manner, tightening of the locking screw 310 will lock the key 300 in the key-way 302, thereby to hold the head casting in any selected vertical location. Upon loosening of the screw 310, the head casting can be raised or lowered, but the bushing will hold the key 300 in sliding engagement with the key-way to prevent rotation of the casting 270 with respect to the column 240. Thus, it will be seen that this construction affords both a simple means to lock and unlock the head casting 270 with respect to axial movement on the column 240, and also insures against relative rotation between the head casting 270 and the column 240.

As best seen in FIGURES 1 and 3, the head casting 270 has a pair of spaced parallel horizontal bores 340 and 342 therein. A pair of horizontally extending tubular shafts 344 and 346, respectively, are held in these bores by set screws (not shown). The shaft 344 is relatively larger than the shaft 346 and provides the principal support for the carriage 28. The shaft 346 is used both to aid in supporting the carriage 28 and to restrict rotation of the carriage 28 about the main shaft 344. An end casting 350 (FIGURE 1) having a pair of apertures complementary to the shafts 344 and 346, ties the outer ends thereof together and is secured to the shafts 344 and 346 as by suitable pins 351. A suitable trim member or cover 360 overlies the shafts 344 and 346 to shield the shafts 344 and 346 and the carriage 28 against the infiltration of dust and foreign materials.

Figure 9:
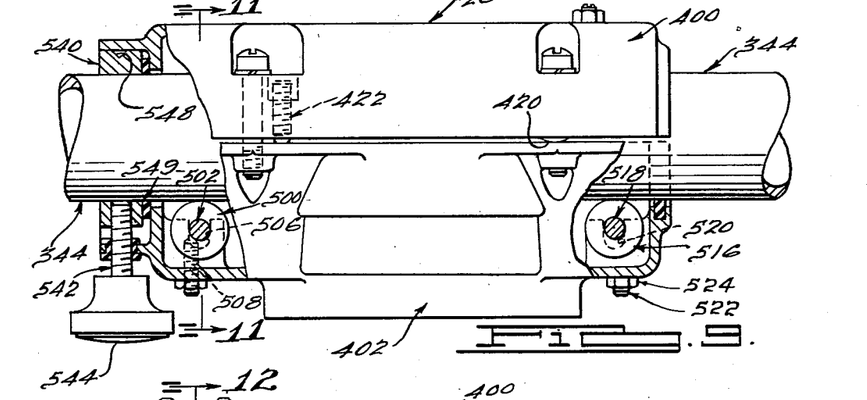
FIG. 9 is a side view of the carriage of FIG. 8, partially broken away for clarity.
Figure 10:
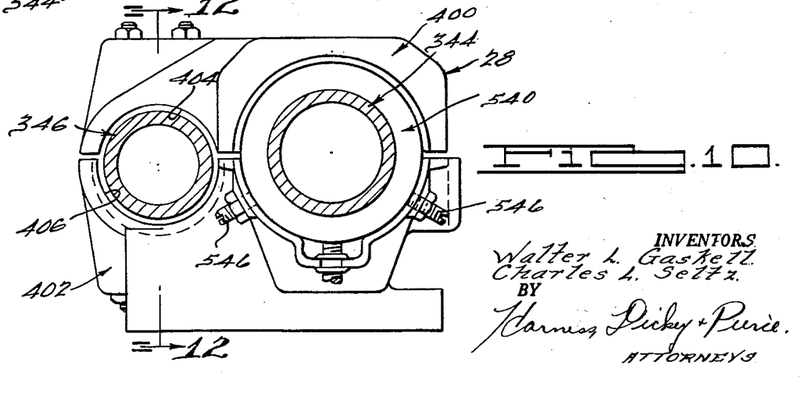
FIG. 10 is a cross sectional view taken substantially along the line 10—10 of FIG. 8.

As best seen in FIGURE 9, the carriage 28 comprises an upper section 400 and a lower section 402, which may be, for example, die castings. The carriage sections 400 and 402 have suitable arcuate sections 404 and 406, (FIGURE 10) respectively, for the acceptance of the shaft 346 and arcuate sections 408 and 410 (FIGURE 11), respectively for the acceptance of the shaft 344. The sections 400 and 402 are secured together by a plurality of machine screws 412, 414, 416 and 418 that extend downwardly through suitable apertures in the upper section 400 and are threadably engageable in complementary threaded bores in the lower section 402.

It is to be noted the upper section 400 is provided with a pair of fulcrums 420, (one of which is shown in FIGURE 9), on opposite sides of the shaft 344, that function as pivot points when the sections 400 and 402 are joined together by the screws 416, 418. The fulcrums 420, in conjunction with a pair of set screws 422 and 424 that are threadably engaged in the upper carriage section 400 in parallel relationship to and adjacent the machine screws 412 and 414, facilitate alignment of the sections 400 and 402. Adjustment of the sections 400 and 402 is accomplished by advancing or retracting the set screws 422 and 424 to bias the carriage section 402 about the fulcrums 420 with respect to the section 400, the machine screws 412 and 414 being tightened after such adjustment is effected to positively retain the carriage sections 400 and 402 in a desired alignment. This adjustment is provided to bring the lower section 402 into parallel with the longitudinal axes of the shafts 344 and 346.

Figure 11:
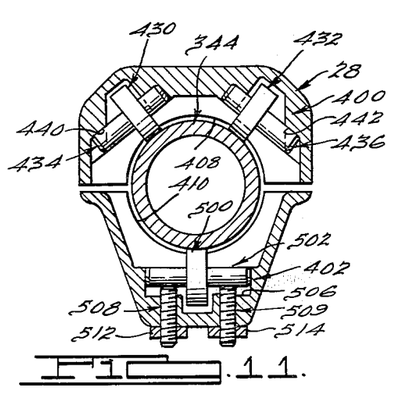
FIG. 11 is a cross sectional view taken substantially along the line 11—11 of FIG. 9.

Referring to FIGURE 11, the upper section 400 of the carriage 28 is supported for movement with respect to the support shaft 344 by a pair of circumferentially spaced rollers 430 and 432. The rollers 430 and 432 are ball bearing supported on a pair of shafts 434 and 436, respectively, that are oriented in generally tangential relationship to the shaft 344. The pins 434 and 436 are supported in a pair of complementary recesses 440 and 442 in the top section 400 of the carriage 28. It is to be noted that the carriage 28 has a second set of rollers (not shown) similar to the rollers 430 and 432 at the rear end of the upper section 400, the orientation and function thereof being identical to the rollers 430 and 432 thereby to positively support the carriage 28 for movement longitudinally of the main support shaft 344.

Rotation of the carriage 28 about the central axis of the shaft 344 is precluded by a roller 460 (FIGURE 12) supported on a roller pin 462 that is accommodated in a complementary recess 464 in the top section 400 of the carriage 28. It is to be noted that the roller 460 engages the shaft 346 and, because of its radial spacing from the center line of the shaft 344, precludes rotation of the carriage 28 about the central axis of the shaft 344.

Figure 8:
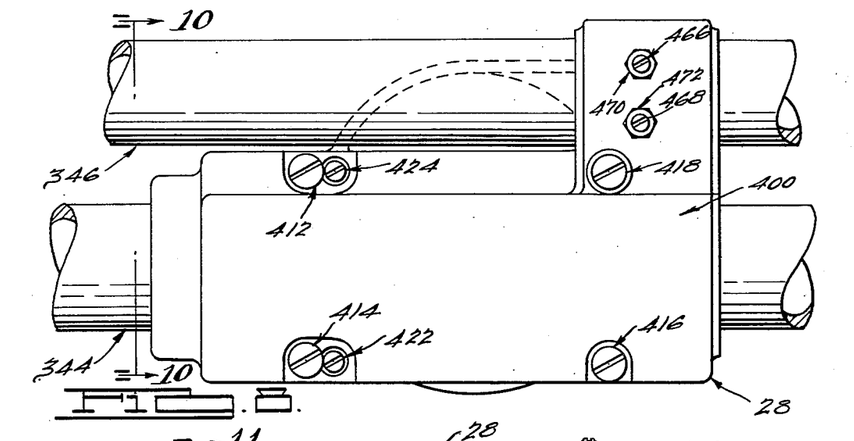
FIG. 8 is a top view of the radial arm similar to FIG. 6 with the cover thereof removed to show the tool supporting carriage.

The rotational position of the carriage 28 about the center line of the shaft 344 is adjusted by advancement or retraction of a pair of set screws 466 and 468 (FIGURE 8) that are provided with suitable lock nuts 470 and 472, respectively, thereby to define the vertical position of the pin 462 of the roller 460. Advancement or retraction of the set screws 466 and 468 lowers or raises the pin 462 in its complementary slot 464 in the upper section 400 of the carriage 28 thereby rotating the upper section 400 about the center line of the shaft 344 to provide for alignment of the lower section 402 with the plane containing the lowermost surfaces of the shafts.

The lower section 402 of the carriage 28 is, of course, complementary to the upper section 400 and is provided with a number of rollers to positively locate the carriage 28 on the shafts 344 and 346 thereby to limit the carriage 28 to reciprocating movement with respect to the shafts 344 and 346.

As best seen in FIGURES 9 and 11, the lower section 402 of the carriage 28 has a roller 500 underlying the shaft 344 and supported on a tangentially oriented pin 502. The pin 502 is movable vertically of the carriage section 402 in a vertically oriented recess 506 (FIGURE 9) and is biased vertically thereof by a pair of set screws 508 and 509. The set screws 508 and 509 are provided with suitable lock nuts 512 and 514, respectively, so that, upon advancement of the set screws 508 and 509, the roller 500 is biased vertically against the shaft 344. As best seen in FIGURE 9, a roller 516 similar to the roller 500 is mounted on a pin 518 that is disposed in a vertical slot 520 in the carriage section 402. The pin 518 is movable vertically of the slot 520 under the bias of a pair of set screws 522 (one of which is shown), suitable lock nuts 524 being provided therefore to lock the pin 518 at a desired vertical level. In this manner, the carriage 28 is positively positioned on its supporting shaft 344.

Figure 12:
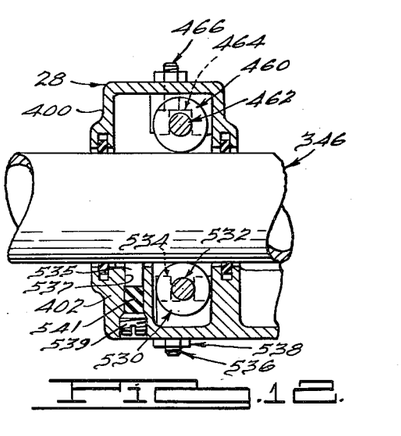
FIG. 12 is a cross sectional view taken substantially along the line 12—12 of FIG. 10.

As best seen in FIGURE 12, the bottom section 402 has a roller 530 underlaying the shaft 346 at a point directly beneath the roller 460, whereby the roller 460 can be biased downwardly against the shaft 346 after vertical adjustment thereof. The roller 530 is supported on a pin 532 that is movable in a vertically oriented slot 534 under the bias of a pair of adjustment screws 536, (one of which is shown), which are locked by suitable lock nuts 538.

A friction drag is provided for adjusting the freedom of carriage movement. This comprises a plug 535 of durable, low-friction material, such as Teflon, located in a vertical bore 537 and biased against the shaft 346 by a set screw 539 acting through a resilient spacer plug 541 of rubber or the like.

Referring to FIGURE 9, the carriage 28 is lockable longitudinally of the shafts 344 and 346 by a locking collar 540. The collar 540 is disposed about the shaft 344 and is tightened thereagainst upon advancement of a screw 542 having a handle 544 thereon to facilitate hand tightening thereof. The collar 540 is restrained from movement with respect to the carriage 28 by a set screw 546 (FIG. 10) that is engaged in a complementary V-groove 548 in the collar 540. A seal 549 may be provided between the collar 540 and sections 400 and 402 to preclude the passage of foreign materials into the carriage 28.

As best seen in FIGURE 7, the lower section 402 of the carriage 28 is provided with a generally circular downwardly facing boss 550 having a central aperture 552 for the acceptance of a vertically extending pin 560. The pin 560 extends upwardly through a central aperture 562 in a generally circular top plate 564 of a downwardly depending power unit support arm 570. The arm 570 is rotatable with respect to the carriage 28 about the pin 560. The arm 570 is lockable at a desired rotational position with respect to the carriage 28 upon tightening of a nut 580 that is disposed about the upper end of the pin 560. The nut 580 has a radially outwardly extending arm 582 with a handle 584 thereon (FIGURE 6), rotation of the arm 582 and nut 580 effecting tightening of the connection between the arm 570 and boss 550 of the carriage 28. A plurality of dished or spring washers 586 maintain a slight tension across the connection to eliminate play between the parts when the nut 580 is loosened.

Because it is desirable to effect tightening of the nut 580 upon a predetermined maximum arcuate movement of the arm 582, provision is made for the presetting of the rotative position of the nut 580 with respect to the pin 560.

As best seen in FIGURE 7, a locking plate 590 is disposed about the pin 560 and keyed thereto as by engagement of a pair of diametrically spaced flats 592 on the pin 560 (one of which is shown) with a complementary aperture in the plate 590. The plate 590 has a plurality of radially inwardly extending circumferentially spaced slots 594 for the acceptance of the inner end portion of an index screw 596. Upon backing off of the index screw 596, the plate 590 is rotatable with the pin 560 which is rotated as by engaging a conventional socket wrench with a hexagonal head portion 598 thereof.

Adjustment of the connection between the carriage 28 and the arm 570 is initiated by placing the handle 582 and nut 580 at a desired locked position whereupon the pin 560 is advanced until a desired locking tension is obtained across the connection. The screw 596 is then advanced radially inwardly until the inner end portion thereof engages in one of the slots 594 in the plate 590 thus precluding further rotation of the pin 560 with respect to the carriage 28. Thereafter, rotation of the nut handle 582 effects a backing off of the nut with respect to the pin 560 freeing the arm 570 for rotation with respect to the carriage 28. In this manner a positive locking between the arm 570 and carriage 28 is obtained by a relatively small increment of rotation of the locking handle 582, the lock position of the handle 582 and therefore the release position thereof being positively predetermined but readily readjustable if necessary or desirable.

As best seen in FIGURE 6, rotation of the arm 570 with respect to the bottom section 402 of the carriage 28 is indexed by a vertically extending pin 600 that is supported for vertical movement by a horizontally extending pin 602 having a handle 604 at an outer end thereof. The pin 602 is movable vertically of the lower section 402 of the carriage 28 in a vertically oriented slot 606 (FIGURES 1 and 2), the vertically oriented pin 600 moving into engagement with selected ones of a plurality of conical head set screws 610, 616 on the arm 570. The set screws 610, 616 have conical head portions so that, upon retraction or advancement thereof with respect to the upper end portion 564 of the arm 570 the rotational position of the arm 570 with respect to the carriage 28 can be adjusted. In this manner the plane of the saw blade 32 is aligned with the longitudinal axes of the supporting shafts 344 and 346 in an index position. It is to be noted that the pins 610 and 616 are angularly related to one another with respect to the central axis of the pin 560 so as to lock the arm 570 and therefore the blade 32 in either the crosscut position parallel to the shafts 344 and 346 or in a plane normal to the central axis of the shafts 344 and 346 to facilitate ripping of a workpiece.

Figures 15, 16:
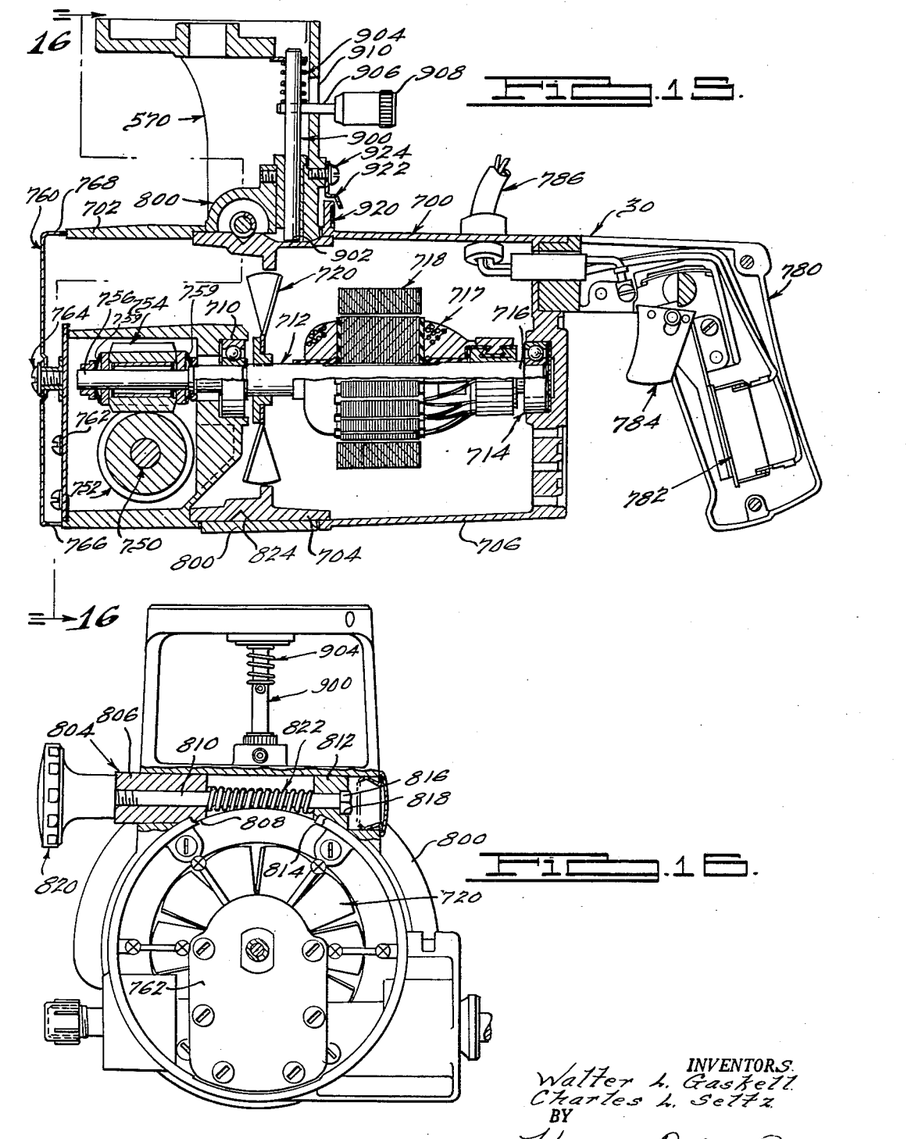
FIG. 15 is a sectional view of the power unit taken substantially along the line 15—15 of FIG. 2.
FIG. 16 is a cross sectional view taken substantially along the line 16—16 of FIG. 15.

As best seen in FIGURES 15 and 16, the power unit 30 comprises a housing 700 for the support of a high speed electric motor. The housing 700 comprises an annular front section 702, an annular intermediate section 704 and a closed cylindrical rear section 706. The front section 702 supports a suitable bearing 710 for the support of the motor armature shaft 712. The rear section 706 of the housing 700 supports a bearing 714 for the support of a rear end 716 of the armature shaft 712. A conventional wound armature 717 is mounted on the shaft 712, suitable field poles 718 and energizing coils therefor (not shown) being supported and housed within the rear end section 706 of the housing.

A fan 720 is mounted on the armature shaft 712 intermediate the bearing 710 and the armature 717 for the purpose of inducing a flow of air axially inwardly through the end wall of the rear housing section 706, and thence through the motor housing 700.

The front end portion 702 of the motor housing 700 encloses and supports a tool supporting arbor 750 having a worm gear 752 mounted thereon in operative association with a worm 754 mounted on an outer end 756 of the armature shaft 712. A safety clutch comprising, for example, a plurality of Belleville washers 759, transmits rotation of the armature shaft 712 to the worm 754 thereby effecting rotation of the worm gear 752 and tool supporting arbor 750.

It is to be noted that the front end portion 702 of the housing 700 is closed by an end plate 760 that is secured, as by a screw 764, to a radially extending plate 762 on the housing portion 702. The plate 762 closes the worm and worm gear compartment.

In accordance with one feature of the present invention, the end plate 760 has a plurality of radially outwardly opening apertures 766 in an axially extending flange 768 thereof to direct the flow of air induced through the motor housing 700 by the fan 720 radially outwardly of the housing 700 and against the workpiece in the area of contact of the saw blade 32 therewith to blow sawdust away from the immediate area of the cut in the workpiece. In this manner, the flow of air through the motor housing 700 serves a dual function, namely, cooling of the motor and the clearing of sawdust away from the area of the cut in the workpiece.

A handle 780 is secured to the end portion 706 of the housing 700 to facilitate pulling of the power unit 30 and carriage 28 longitudinally of the radial arm 26. The handle 780 encloses a switch 782 that is actuated by a pivotally supported trigger 784. A flexible electrical conductor 786 extends into the motor housing 700 and handle 780 to effect energization of the motor through the switch 782.

The motor housing 700 is supported with respect to the downwardly depending arm 570 in an annular ring 800 complementary to the intermediate portion 704 of the housing 700. The inner portion 704 of the housing 700 serves as a bearing surface to facilitate rotation and indexing of the housing 700 with respect to the ring 800 of the arm 570.

Figure 14:
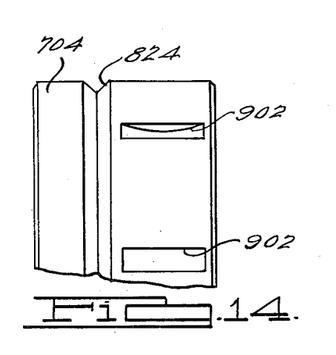
FIG. 14 is a fragmentary side view of a portion of the power unit showing the slots for indexing rotation thereof about an axis parallel to the plane of the table.

As best seen in FIG. 16, the motor housing 700 is locked against rotation with respect to the ring 800 of the arm 570 by a barrel lock 804 comprising a tubular member 806 having a cam face 808 thereon engageable with the intermediate portion 704 of the housing 700. The barrel lock 804 has a shaft 810 that extends through the tubular member 806 and is engageable with a member 812 at the opposite end thereof. The member 812 has a cam face 814 engageable with the intermediate portion 704 of the housing 700. The shaft 810 has a rectangular head portion 816 that is accepted in a complementary recess 818 in the member 812 thereby to preclude relative rotation therebetween. Movement of the members 806 and 812 toward one another is effected by tightening a hand knob 820 against the tubular member 806 thereby to bias the cam faces 808 and 814 of the members 806 and 812, respectively against the intermediate member 704 of the housing 700. The members 806 and 812 are normally biased apart by a helical compression spring 822 that extends extends between the cam members 806 and 812 and is normally accepted within a peripheral groove 824 in the intermediate member 704 (FIG. 14).

The motor housing 700 and therefore the arbor shaft 750 can be positioned and locked at any desired rotational position with respect to the vertically extending arm 570. However, when it is desired to index the motor housing 700 and therefore the plane of the saw blade 32 in, for example, a vertical plane, an index pin 900 is engageable in one of a plurality of complementary slots 902 in the intermediate portion 704 of the housing 700, (FIGS. 14 and 15). The index pin 900 is normally biased downwardly by a helical compression spring 904 and is movable upwardly upon vertical movement of a transversely extending pin 906 having a handle 908. The pin 906 is movable in a vertically extending slot 910. An index plate 920 (FIGS. 2 and 15) having suitable indicia thereon to indicate the angle of rotation between the motor housing 700 and arm 570, cooperates with a pointer 922 that is secured to the arm 570 by a machine screw 924.

Thus, the power unit 30 can be rotated to any desired rotational position with respect to the arm 570 and locked therein by tightening of the barrel lock 804 by rotation of the knob 820 thereof. To index rotation of the power unit 30 to the most used positions, for example, the position wherein the blade 32 is in a vertical plane with respect to the work table 22 or at angles of 90 degrees on either side of a vertical plane, the index pin 900 is engageable in the slots 902 in the intermediate portion 704 of the housing 700.

As best seen in FIGURES 1 and 3, a saw blade guard 1000 is secured to the power unit 30 so as to be movable therewith. The guard 1000 supports a downwardly extending dog shaft 1002 that is vertically positionable with respect to a workpiece (not shown) so that a rotatable dog 1003 thereon will engage the workpiece to preclude kickback during ripping operations. In this connection, it may be noted that rip cuts normally will be made with the carriage 28 locked in place and the power unit 30 set with the blade 32 parallel to the guide 40. The workpiece then is moved beneath the stationary power unit, with the dog 1003 being tilted rearwardly on the workpiece to prevent reversal of the direction of workpiece movement.

The dog shaft 1002 is lockable in any desired vertical position upon rotation of a knob 1004.

In accordance with another feature of the present invention, a workpiece hold-down arm 1020 is slideably supported by a pin 1022 that extends through a suitable aperture in the frontal edge 1024 of the guard 1000. The pin 1022 extends through a suitable slot 1026 in the hold-down arm 1020, to guide and support the arm 1020 for movement with respect to the guard, the curvature of the arm 1020 being complementary to the curvature of the frontal edge 1024 of the guard. The pin 1022 has a threaded outer end portion for acceptance within a complementary hand knob 1030 whereby, upon tightening of the knob 1030, the hold-down arm 1020 is biased against the frontal edge section 1024 of the cover 1000.

The hold-down arm 1020 has a reentrantly folded lower end portion 1034 for engagement with the upper surface of a workpiece (not shown) thereby to hold the workpiece downwardly against the upper surface of the table 22. It is to be noted that in this manner, the hold-down arm is maintained in continuing engagement with the workpiece, the end portion 1034 thereof being slideable across the workpiece upon movement of the blade 32 longitudinally of the radial arm 26. Hold-down 1020 is used only for making rip cuts.

It is to be understood that the specific construction of the improved radial arm saw herein disclosed and described is presented for the purpose of explanation and illustration and is not intended to indicate limits of the invention, the scope of which is defined by the following claims.

What is claimed is:

1. In a radial arm saw comprising a base, a table for the support of a workpiece, a vertical column supported by said base, a radial arm supported by said column and movable vertically thereof, a carriage supported by said radial arm and movable longitudinally thereof, and a power unit including a tool holding arbor supported by said carriage for movement longitudinally of said radial arm, the improvement comprising means for locking the radial arm vertically of the column by a predeterminable movement of a handle comprising a longitudinal groove on the outer periphery of the column, a key movably supported in alignment with said groove, and means for adjustably biasing said key into said groove comprising a threaded locking screw having an end portion engageable with said key and a handle portion, a bushing having internal threads complementary to said locking screw and external threads for acceptance in a complementary bore in the radial arm, and means on said bushing for advancing said bushing axially and locking said bushing against said key whereby to hold said key in sliding position in said groove, said screw being rotatable to advance the end portion to a position locking said key in said groove.

2. In a radial arm saw comprising a base, a generally planar table on said base for the support of a workpiece, a vertical column supported by said base, a radial arm supported by said column, and a carriage supported by said radial arm and movable longitudinally thereof, the improvement comprising a power unit having a generally cylindrical housing, an arm depending downwardly from said carriage having a contractible ring engageable about the housing of said power unit, said power unit having an armature at one end rotatable about the central axis thereof and a tool holding arbor at the other end thereof rotatable about an axis generally normal to the axis of the armature, said power unit being rotatable about its central axis within the contractible ring on said arm to vary the angular relationship between the central axis of said tool holding arbor and the plane of said table, the ring on said carriage arm encircling said housing between the armature and the arbor of said power unit.

References Cited in the file of this patent

UNITED STATES PATENTS

| | | |
|---|---|---|
| 183,181 | Levy | Oct. 10, 1876 |
| 206,648 | Tucker | July 30, 1878 |
| 564,741 | Dunn | July 28, 1896 |
| 1,496,035 | Thomson | June 3, 1925 |
| 1,528,535 | Dewalt | Mar. 3, 1925 |
| 1,623,290 | Wappat | Apr. 5, 1927 |
| 1,846,641 | Hedgpeth | Feb. 23, 1932 |
| 1,865,759 | Hughes | July 5, 1932 |
| 1,872,718 | Flanigan | Aug. 23, 1932 |
| 1,918,519 | Clements | July 18, 1933 |
| 1,932,511 | Clarke | Oct. 31, 1933 |
| 2,254,046 | Pearson | Aug. 26, 1941 |
| 2,317,568 | Wallace et al. | Apr. 27, 1943 |
| 2,329,345 | Gardner | Sept. 14, 1943 |
| 2,353,088 | Schutz | July 4, 1944 |
| 2,401,002 | Langfelder | May 28, 1946 |
| 2,522,789 | Johnson | Sept. 19, 1950 |
| 2,627,880 | Johnson | Feb. 10, 1953 |
| 2,722,952 | Snyder | Nov. 8, 1955 |
| 2,804,892 | Peterson | Sept. 3, 1957 |
| 2,811,994 | Dooley | Nov. 5, 1957 |
| 2,835,285 | Gardner | May 20, 1958 |
| 2,870,801 | Cravens | Jan. 27, 1959 |